(12) United States Patent
Sauvage et al.

(10) Patent No.: US 7,142,658 B2
(45) Date of Patent: Nov. 28, 2006

(54) DTMF CONTROL

(75) Inventors: Pierre Sauvage, Notre Dame de Commiers (FR); Marc Brandt, Eybens (FR); Robert Hyerle, Bernin (FR)

(73) Assignee: Hewlett-Packard Development Company L.P., Houston, TX (US)

( * ) Notice: Subject to any disclaimer, the term of this patent is extended or adjusted under 35 U.S.C. 154(b) by 5 days.

(21) Appl. No.: 10/610,588

(22) Filed: Jul. 2, 2003

(65) Prior Publication Data

US 2004/0101128 A1 May 27, 2004

(30) Foreign Application Priority Data

Jul. 5, 2002 (EP) .................................. 02354105

(51) Int. Cl.
*H04M 3/42* (2006.01)
*H04M 7/00* (2006.01)
*H04L 12/66* (2006.01)

(52) U.S. Cl. ............................. 379/211.02; 379/221.02; 370/352; 370/354

(58) Field of Classification Search ................ 370/354, 370/352, 526; 379/93.09, 211.02, 221.02, 379/93.26
See application file for complete search history.

(56) References Cited

U.S. PATENT DOCUMENTS

| | | | |
|---|---|---|---|
| 5,165,096 A * | 11/1992 | Matsumoto | 379/93.26 |
| 5,341,415 A * | 8/1994 | Baran | 379/221.02 |
| 5,438,618 A | 8/1995 | Jantzi et al. | |
| 5,781,626 A | 7/1998 | Koue | |
| 6,009,152 A * | 12/1999 | Bourhis | 379/93.09 |
| 6,208,638 B1 * | 3/2001 | Rieley et al. | 370/354 |
| 6,408,067 B1 | 6/2002 | Robinson | |
| 6,456,618 B1 * | 9/2002 | Kozdon et al. | 370/352 |
| 6,584,094 B1 * | 6/2003 | Maroulis et al. | 370/352 |
| 6,650,662 B1 * | 11/2003 | Arnaud et al. | 370/526 |

FOREIGN PATENT DOCUMENTS

WO        WO 93/03570        2/1993

* cited by examiner

*Primary Examiner*—Wing Chan
*Assistant Examiner*—Thjuan P. Knowlin
(74) *Attorney, Agent, or Firm*—Foley & Lardner LLP

(57) ABSTRACT

A method of selectively sending a DTMF tone from a terminal to a first or a second destination, wherein the terminal sends a signal comprising at least one DTMF tone to an intermediate module prior to distribution to the intended destination, comprising: receiving the signal at the intermediate module;

analyzing the nature of any DTMF tones in a portion of the received signal to determine the intended destination thereof; and sending a DTMF tone corresponding to the DTMF tones in the received signal to the determined destination.

16 Claims, 1 Drawing Sheet

DTMF CONTROL

BACKGROUND OF THE INVENTION

1. Field of the Invention

The present invention relates generally to the field of telecommunications, and more particularly to improvements in the way in which DTMF tones may be used to control diverse systems such as telephony-based systems.

2. Description of the Related Art

There exists an increasing number of advanced voice applications such as voice mail, telephone banking systems and such like, which are controllable by a user through a telephone handset. Although voice recognition technology is now at a level that may now enable users to control such applications using spoken commands, the majority of such systems still rely on control signals in the form of DTMF tones generated by telephone handsets.

Typically a voice application is accessed through a telephone-type connection, for example by dialing a subscriber number associated with the application. Once connected, the user is typically presented with spoken menus that may be navigated through by sending DTMF tones from the user handset to the application. When finished with the application, the user typically hangs-up and is subsequently ready to place or receive new calls in a conventional manner.

Whilst accessing such advanced applications in the above-described manner is generally problem free, problems may arise when accessing such applications via intermediate services such as third party network operators, for example using a telephone calling card, or 'dial-out' conferencing services.

In the case of telephone calling cards a user typically places a free or low-cost call to a call center which, upon connection, the user enters authorization information such as an account number in order to gain access to their account. Typically the authorization information is entered by sending DTMF tones from the user's telephone handset to the call center. Once authorization is complete a dial tone is generally obtained allowing the user to enter, again using DTMF tones, a new subscriber number to which to be connected. In addition to being responsive to DTMF tones to allow a new call to be place, the call centers typically allow the user to hang-up a call without physically terminating the connection between the user and the call center by sending a predetermined DTMF tone or tone sequence—this allows a user to make multiple calls one after the other without having to redial the call center and reenter the authorization information each time. The call center may also respond to other DTMF tones to inform the user, for example, of credit remaining, account expiry date etc.

If such an intermediate service is used to access a voice application a situation may arise in which both the intermediate service and the voice application are responsive to DTMF tones sent from a user handset. If the DTMF tones, for example, intended for a voice mail application are interpreted by the call center the results may be at best unpredictable and in any case are likely to result in confusion for the user. This problem is further exacerbated by the fact that the vast majority of telephone handsets can only generate 12 different DTMF tones; a fact which increases the probability that different DTMF controllable applications will be responsive to at least some common DTMF tones.

BRIEF SUMMARY OF THE INVENTION

One aim of the present invention is to at least mitigate some of the problems of the prior art.

According to a first aspect of the present invention, there is provided a method of selectively sending a DTMF tone from a terminal to a first or a second destination, wherein the terminal sends a signal comprising at least one DTMF tone to an intermediate module prior to distribution to the intended destination. The method comprises receiving the signal at the intermediate module, analyzing the nature of any DTMF tones in a portion of the received signal to determine the intended destination thereof; and sending a DTMF tone corresponding to the DTMF tones in the received signal to the determined destination.

Advantageously, no modification is required to existing DTMF tone generation equipment or voice applications and the user is provided with a convenient and simple mechanism for precisely determining the destination of DTMF tones issued from their terminal.

The analysis step may comprise analyzing the nature of the DTMF tones to determine the number of DTMF tones in the portion of the received signal. Where it is determined that only a single DTMF tone is present therein a DTMF tone may be sent to a first destination. Where it is determined that a plurality of DTMF tones are present therein a DTMF tone corresponding to at least some of the DTMF tones in the signal may be sent to a second destination.

The analysis step may, alternatively or in addition, comprise analyzing the nature of the DTMF tones to determine the length of any DTMF tones in the portion of the received signal. In this way where it is determined that a DTMF tone having a duration less than a predetermined threshold is present therein, a DTMF tone may be sent to the first destination. Where it is determined that a DTMF tone having a duration greater than then the predetermined threshold is present therein a DTMF tone may be send to a second destination.

Preferably the analysis step is adapted for analyzing a portion having a predetermined duration.

It may be preferable, where it is determined that a plurality of DTMF tones are present in the signal, to remove at least one of the DTMF tones from the signal.

Where it is determined that a plurality of DTMF tones are present in the signal, if may be preferable to send, to a destination indicated by the first DTMF tone, a DTMF tone based on the following DTMF tone.

One of the destinations may be a control unit internal to the intermediate module and the other destination may be a called party connected to the intermediate module.

Alternatively both of the destinations may be called parties connected to the terminal through the intermediate module.

According to a further aspect of the present invention there is provided a system for selectively sending a DTMF tone from a terminal to a first or a second destination, wherein the terminal sends a signal comprising at least one DTMF tone to an intermediate module prior to distribution to the intended destination. The system comprises an interpreter for analyzing the nature of any DTMF tones in a portion of the received signal for determining the intended destination thereof, as well as a signal processor for sending a DTMF tone corresponding to the DTMF tones in the received signal to the determined destination.

The interpreter may determine the number of DTMF tones in the portion of the received signal in which case, where it is determined that only a single DTMF tone is present therein, a DTMF tone may be sent to the first destination. Where it is determined that a plurality of DTMF tones are present therein, a DTMF tone corresponding to the DTMF tones in the signal may be sent to the second destination.

Alternatively, the interpreter may determine the length of any DTMF tones in the portion of the received signal. In this case, where it is determined that a DTMF tone having a duration of less than a predetermined threshold is present therein, a DTMF tone may be sent to a first destination and where it is determined that a DTMF tone having a duration a greater than then the predetermined threshold is present therein, a DTMF tone may be send to a second destination.

Preferably the interpreter is adapted for analyzing a portion having a predetermined duration.

It may also be preferable that the signal processor removes at least one of the DTMF tones from the signal where it is determined that a plurality of DTMF tones are present therein.

The signal processor may be further adapted for sending, where it is determined that a plurality of DTMF tones are present in the signal, to a destination indicated by the first DTMF tone, a DTMF tone based on the following DTMF tone.

One of the destinations may be a control unit internal to the intermediate module and the other destination may be a called party connected to the intermediate module.

Alternatively both of the destinations may be called parties connected to the terminal through the intermediate module.

According to yet a further aspect, a telecommunications network is provided which is operative in accordance with the method of the present invention.

BRIEF DESCRIPTION OF THE DRAWINGS

Embodiments of the invention will now be described, by way of example only, with reference to the accompanying diagrams, in which.

DESCRIPTION OF THE EXEMPLARY EMBODIMENTS

Figure 1:
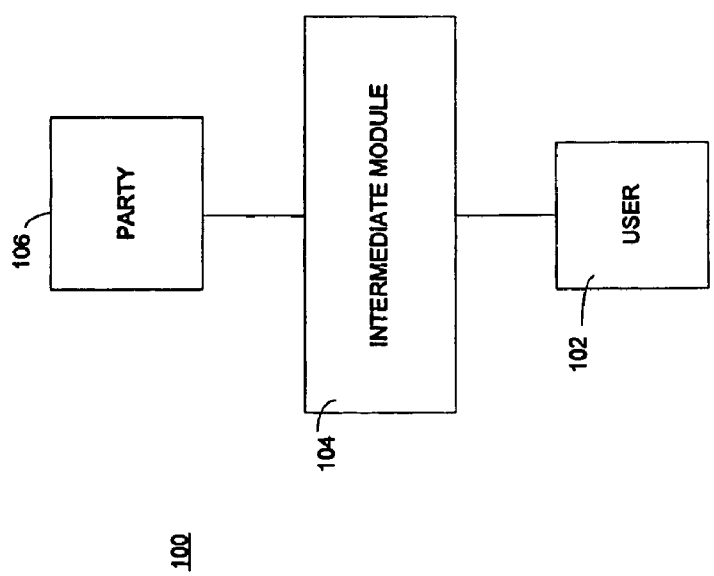
FIG. 1 is a block diagram outlining a typical system according to the prior art by which a user, using a user terminal, connects to a party via an intermediate module.

FIG. 1 is a block diagram outlining a typical system according to the prior art by which a user, using a user terminal 102, may connect to a party 106 via an intermediate module 104 such as a calling card call center or dial-out conferencing facility. Depending on the type of network used, the user terminal 102 may be, for example a telephone in the case of a PSTN network, or a computer in the case of a VoIP network.

In a call, as is well known, the user terminal may transmit voice signals, which may convey for example speech, DTMF tones and the like, to the party 106. The intermediate module 104 continuously monitors the voice signals from the user terminal 102 for the presence of DTMF tones. If a DTMF tone is detected it may be used to control the intermediate module, for example by terminating the connection between the intermediate module 104 and the party 106 thereby allowing the user to 'hang-up' the connection without terminating the connection between the user termi-nal 102 and the intermediate module 104. Since the DTMF tones are part of the voice signal sent by the terminal, the called party also receives the DTMF tones.

If the called party 106 is a voice application that is also responsive to DTMF tones, it is likely that any DTMF tones sent to control the intermediate module 104 may also, albeit unintentionally, be interpreted by the voice application, which may lead to unintentional control of the voice application. Whilst at best such behavior could be undesirable, if the voice application is a telephone banking service, for example, the consequences could be somewhat more important.

The number of different standard DTMF tones that may be generated is limited principally by the number of keys available on a telephone keypad. Accordingly, the ITU-T recommendations Q.23 and Q.24, which define the international standard for DTMF tones, define only 16 DTMF tones, of which only 12 are commonly accessible from typical telephone keypads.

Given the strongly established DTMF standards and the existence of standard DTMF generating and decoding equipment it is not practical to consider increasing the number of DTMF tones available. Therefore the increasingly complex control of an increasing number of advance voice applications must preferably still be possible using the currently available standard DTMF tones. The present invention introduces the concept of double DTMF tones (hereinafter referred to as DDTFM tones) described below.

Figure 2:
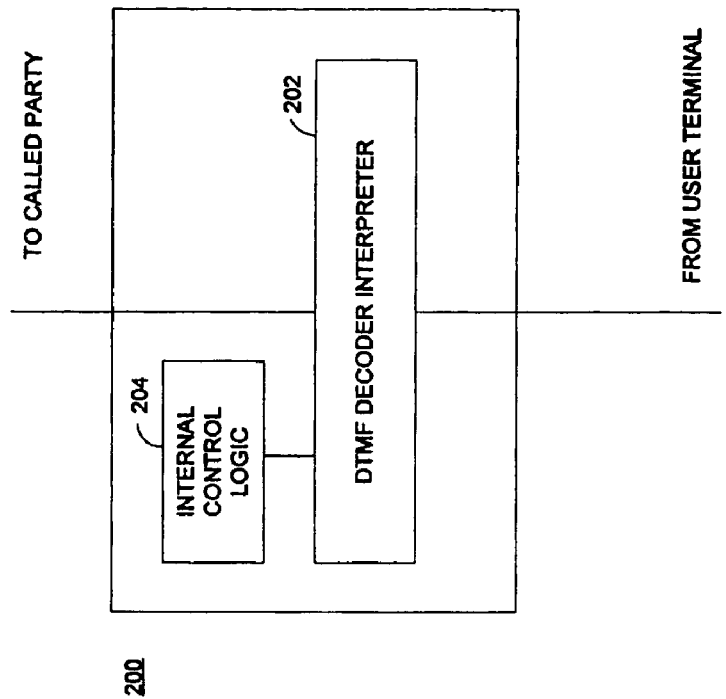
FIG. 2 is a block diagram of an intermediate module according to an embodiment of the present invention.

FIG. 2 is a block diagram showing an intermediate module 200 according to an embodiment of the present invention.

The intermediate module 200 functions largely in the manner described above with reference to FIG. 1. The intermediate module 200 additionally comprises a DTMF decoder/interpreter 202 that decodes DTMF tones received from the user terminal 102 and analyzes them to decide whether they are intended for an internal control logic module 204 or to the called party 106.

For example, if a user wishes to send a DTMF tone to the internal control logic 204 of the intermediate module 200 they simply press the appropriate key on their telephone keypad causing a single DTMF tone to be sent. The DTMF tone is received by the DTMF decoder/interpreter 202 which detects the tone, interprets it as being intended for the internal control logic 204 and sends a corresponding DTMF tone thereto. Preferably the DTMF tone sent to the control logic is the same as the DTMF tone send by the user terminal, although it may desirable to provide a mapping to a different DTMF tone or other control signal. The voice signal from the user terminal 102 is then processed, for example using a filter or other signaling processing function, to remove the received DTMF tone from the voice signal thereby ensuring that the called party 106 does not receive a DTMF tone not intended for it. In this way, a DTMF tone sent to the internal control logic 204 will not be sent to the called party 106 and thus ensuring that any DTMF tone sent by the user terminal are only delivered to a single destination.

If the user now wishes to send a DTMF tone to the called party 106 a DDTMF tone may be used. A DDTMF tone, according to the present embodiment, comprises two identical concurrent DTMF tones in which the time period between each tone is within a predefined time period. For example, if the subscriber sends two identical and consecutive DTMF tones from the terminal 102 within an interval of, for example, less than 1 second between the two tones, this may be interpreted by the DTMF decoder/interpreter 202 as a DDTMF tone. If the interval between the two identical consecutive DTMF tones is greater than 1 second the control signal monitor may interpret this as being two single DTMF tones.

The effect of a DDTMF tone is to cause a single DTMF tone, preferably the same as the repeated DTMF tone, to be sent a different destination to that of a single DTMF tone. Thus, although a user sends two DTMF tones to the intermediate module, only a single DTMF tone is delivered to the intended destination.

A DDTMF tone may be detected, for example, by determining whether one or more identical DTMF tones exist within a given portion of the input signal. When a DDTMF tone is detected by the DTMF decoder/interpreter 202 one of the repeated DTMF tones may be removed from the voice signal, for example using an appropriate filter or signal processing function, thereby causing the intended single DTMF tone to be transmitted in the voice signal to the calling party 106. Alternatively, the DTMF decoder interpreter 202 may remove both of the DTMF tones from the voice signal and may cause a new single DTMF tone corresponding to one of duplicated DDTMF tones to be sent to the called party 106 in the voice signal. Such a function may be achieved through use of a suitable signal processor capable of filtering and DTMF tone generation. In any case, although two DTMF tones are sent by the user terminal, only a single DTMF tone is delivered to the intended destination.

In this way, a user may easily and precisely control the destination of user generate DTMF tones, by using a single DTMF tone to cause a single DTMF tone to be sent to a first destination, and by using a DDTMF tone to cause a single DTMF tone to be sent to a second destination.

The interval between consecutive DTMF tones which may be used to determine whether two identical consecutive tones are intended to cause either two identical tones to sent be to a first destination or to cause a single DTMF tone to be sent to a second destination may be constrained by the ITU-Q.22 recommendations, which imposes a minimum gap between two consecutive DTMF tones of 40 ms. Preferably therefore the maximum time period required for two identical DTMF tones to be interpreted as a DDTMF tone is not smaller than the specified minimum gap requirements and is preferably longer. The present embodiment may thus be arranged to work within the ITU recommendations advantageously allowing widely available standard DTMF generating equipment to be used. Alternatively new 'non ITU standard' DTFM tone generation and decoding equipment could be used, for example which would allow the maximum gap required for two identical DTMF tones to be interpreted as a DTMF tone to be reduced below 40 ms, therefore allowing DDTMF tones to be interpreted faster. However, standard DTMF tones could be sent by the intermediate module to the required destination in response to such non-standard DTMF tones, thereby ensuring that no modifications are required to existing voice applications.

The interval which determines whether two key presses are interpreted as a two single DTMF tones or one DDTMF tone is preferably adjustable by the user, for example, by storing a set of user parameters at the intermediate module 104.

The destinations to which the different DTMF tones are output are also preferably configurable by the user. For example, it may be desirable to have single DTMF tones directed to the called party 106 and DDTMF tones directed to the internal control logic 204. Alternatively, in the case where the intermediate module allows concurrent connections to multiple called parties, the present embodiment may be adapted to allow single DTMF tones to be directed towards a first called party, and DDTMF tones to be directed to a second called party.

In a further embodiment, DDTMF tones are not limited to comprise a duplicated or repeated DTMF tone, but could also be defined as two different DTMF tones being sent by the user within a predetermined time period. This may, for example, be particularly useful when a user terminal is simultaneously connected to multiple called parties. In this way, a single DTMF tone may still be interpreted by the intermediate module 200 as being intended for the internal control logic 204, whereas a DDTMF tone may be selectively interpreted by the DTMF decoder/interpreter 202 as being intended for one of a number of called parties. For example, a DDTMF comprising the DTMF tones in the form 'K, X' may be interpreted such that the DTMF tone 'K' is the intended destination and DTMF tone 'X' is the DTMF tone to be sent to that destination. In this way, a simple interface is provided which enables the user to quickly send DTMF tones to any one of a number of different destinations.

Those skilled in the art will also appreciate that the above-described concepts may be expanded to cater for triple DTMF tones and so on.

In a further embodiment, use may be made of a long DTMF tone (hereinafter referred to as a LDTMF tone). In the same way that a DDTMF tone can be interpreted as being intended for a different destination or as having a different function to a single DTMF tone or, so may a LDTMF tone. Thus, with reference to the previous examples, a user may send a DTMF tone to a first destination by sending a 'normal' DTMF tone from their telephone handset or to a second destination by sending a LDTMF tone. Preferably a LDTMF is twice as long as a standard DTMF tone, although this may be user specified.

In yet a further embodiment the use of 'normal' DTMF tones, DDTMF tones and LDTMF tones may be combined into a single application to give arise to an important extension to the standard DTMF control interface.

The herein described concept of DDTMF tones and LDTMF tone is not limited to situations where multiple destinations for DTMF tones exist. It is also possible to use DDTMF tones to effectively extend the current range of DTMF tones without requiring any changes to existing telephone handsets or existing DTMF tone generating equipment. For example the combination of DDTMF and/or LDTMF tones may be used to effectively double the number of different control signals that may be generated by a standard telephone handset.

The invention claimed is:

1. A method of selectively sending a DTMF tone from a terminal to a user defined first or second destination, wherein the terminal sends a signal comprising at least one DTMF tone to a single intermediate module prior to distribution to an intended destination, comprising;

receiving the signal at the single intermediate module via which the at least one DTMF tone can be sent to either of the user defined first and second destinations;

analyzing, by the single intermediate module, the nature of any DTMF tones in a portion of the received signal to determine which of the user determined first and second destinations is the intended destination;

sending, by the single intermediate module, a DTMF tone corresponding to the DTMF tones in the received signal to the intended destination, the single intermediate module sending the DTMF tone to the first destination that is a component internal to the single intermediate module via an internal communications line of the single intermediate module when the first destination is the intended destination, and the single intermediate module sending the DTMF tone to the second destination via an external communications line connecting the single intermediate module with the second destination when the second destination is the intended destination; and preventing, by the single intermediate module, the at least one DTMF tone from being sent to a non-determined destination.

2. The method of claim 1, wherein the step of analyzing the nature of the DTMF tones further comprises:
determining the number of DTMF tones in the portion of the received signal; and where it is determined that only a single DTMF tone is present therein, sending the DTMF tone to the first destination; and
where it is determined that a plurality of DTMF tones are present therein, sending a DTMF tone corresponding to at least one of the DTMF tones in the signal to the second destination.

3. The method of claim 1, wherein the step of analyzing the nature of the DTMF tones further comprises:
determining the length of any DTMF tones in the portion of the received signal; and where it is determined that a DTMF tone having a duration of less than a predetermined threshold is present therein, sending a DTMF tone to the first destination; and
where it is determined that a DTMF tone having a duration a greater than then the predetermined threshold is present therein, sending a DTMF tone to the second destination.

4. The method of claim 1, wherein the step of analyzing is adapted for analyzing a portion of the received signal having a predetermined duration.

5. The method of claim 2, wherein, where it is determined that a plurality of DTMF tones are present in the signal, removing at least one of the DTMF tones from the signal.

6. The method of claim 2, wherein, where it is determined that a plurality of DTMF tones are present in the signal, sending to a destination indicated by the first DTMF tone a DTMF tone based on the following DTMF tone.

7. The method of claim 1, wherein one of the destinations is a control unit internal to the single intermediate module and wherein the other destination is a called party connected to the single intermediate module.

8. A system for selectively sending a DTMF tone from a terminal to a user defined first or second destination, comprising:
a single intermediate module which is configured to send signals to at least the first and second user defined destinations and which receives signals comprising at least one DTMF tone from the terminal prior to distribution to either first or second user defined destination, comprising:
an interpreter for analyzing the nature of any DTMF tones in a portion of the received signal for determining which of the user determined first and second destinations is the intended destination;
a signal processor for sending a DTMF tone corresponding to the DTMF tones in the received signal to the intended destination and preventing the at least one DTMF tone from being sent to a non-determined destination,
wherein the signal processor sends the DTMF tone to the first destination that is a component internal to the single intermediate module via an internal communications line of the single intermediate module when the interpreter determines that the first destination is the intended destination, and wherein the signal processor sends the DTMF tone to the second destination via an external communications line connecting the single intermediate module with the second destination when the interpreter determines that the second destination is the intended destination.

9. The system of claim 8, wherein the interpreter is adapted for determining the number of DTMF tones in the portion of the received signal; and
where it is determined that only a single DTMF tone is present therein, sending a DTMF tone to the first destination; and
where it is determined that a plurality of DTMF tones is present therein, sending a DTMF tone corresponding to the DTMF tones in the signal to the second destination.

10. The system of claim 8, wherein the interpreter is adapted for determining the length of any DTMF tones in the portion of the received signal; and
where it is determined that a DTMF tone having a duration of less than a predetermined threshold is present therein, sending a DTMF to the first destination; and
where it is determined that a DTMF tone having a duration a greater than then the predetermined threshold is present therein, sending a DTMF to the second destination.

11. The system of claim 8, wherein the interpreter is adapted for analyzing a portion having a predetermined duration.

12. The system of claim 9, wherein, the signal processor is adapted for removing at least one of the DTMF tones from the signal where it is determined that a plurality of DTMF tones are present therein.

13. The system of any of claim 9, wherein the signal processor is further adapted for sending, where it is determined that a plurality of DTMF tones are present in the signal, to a destination indicated by the first DTMF tone a DTMF tone based on the following DTMF tone.

14. The system of claim 8, wherein one of the destinations is a control unit internal to the single intermediate module and wherein the other destination is a called party connected to the single intermediate module.

15. A telecommunications network operative in accordance with the method of claim 1.

16. The method of claim 1, further comprising:
prior to the receiving step, actuating, by the user, one of a plurality of keys or buttons on the terminal that are provided for DTMF transmission of one of a plurality of different DTMF tones;
if the DTMF tone is to be provided to the second destination, actuating the one of the plurality of keys or buttons on the terminal again by the user within a predetermined time period from when the one of the plurality of keys or buttons was previously actuated by the user,
wherein the analyzing step analyzes whether or not two consecutive DTMF tones of a same tone are included in the signal within a predetermined distance of each other in the signal, and if so, only one of the two consecutive DTMF tones is output to the second destination and none of the two consecutive DTMF tones are output to the first destination, and
wherein, when the analyzing step determines that only one DTMF tone is included in the signal with no other DTMF tone within the predetermined distance of it in the signal, the only one DTMF tone is output to the first destination and is not output to the second destination.

* * * * *